(12) United States Patent
Shi et al.

(10) Patent No.: US 11,687,732 B2
(45) Date of Patent: Jun. 27, 2023

(54) CONTENT MANAGEMENT SYSTEMS FOR PROVIDING AUTOMATED TRANSLATION OF CONTENT ITEMS

(71) Applicant: Open Text Holdings, Inc., San Mateo, CA (US)

(72) Inventors: Lei Shi, San Ramon, CA (US); Partha Saradhi Govind, Cedar Park, TX (US); Paul Kieron Carl Narth, San Carlos, CA (US); Aarthi Balasubramanian, San Mateo, CA (US)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 322 days.

(21) Appl. No.: 16/841,425

(22) Filed: Apr. 6, 2020

(65) Prior Publication Data

US 2021/0312141 A1  Oct. 7, 2021

(51) Int. Cl.
*G06F 40/40* (2020.01)
*G06F 16/33* (2019.01)
*G06F 9/451* (2018.01)
*G06F 40/47* (2020.01)
*G06F 40/216* (2020.01)
*G06F 40/58* (2020.01)

(52) U.S. Cl.
CPC .............. *G06F 40/40* (2020.01); *G06F 9/454* (2018.02); *G06F 16/3344* (2019.01); *G06F 40/216* (2020.01); *G06F 40/47* (2020.01); *G06F 40/58* (2020.01)

(58) Field of Classification Search
CPC ........ G06F 40/58; G06F 40/40; G06F 40/216; G06F 40/47; G06F 9/454
See application file for complete search history.

(56) References Cited

U.S. PATENT DOCUMENTS

| 5,678,039 | A  | * | 10/1997 | Hinks | ..................... | G06F 9/454 |
| 6,061,699 | A  | * | 5/2000 | DiCecco | ................. | G06F 9/454 |
| | | | | | | 717/115 |
| 6,345,243 | B1 | * | 2/2002 | Clark | ..................... | G06F 40/47 |
| | | | | | | 704/7 |
| 6,453,462 | B1 | * | 9/2002 | Meade | .................... | G06F 9/454 |
| | | | | | | 717/124 |

(Continued)

*Primary Examiner* — Samuel G Neway
(74) *Attorney, Agent, or Firm* — Sprinkle IP Law Group (57) ABSTRACT

Systems, methods and products for automatic translation of content items, where in one embodiment a system includes one or more processors configured to identify components of a content item to be translated (translation items) and components not to be translated (non-translation items). The system generates a key-value pair corresponding to each translation item, where the key-value pair includes a key which comprises a unique identifier and a value which comprises a text string of the translation item. The system also generates a translation template that corresponds to the content item, wherein the translation template matches the content item except that the text string of each translation item is replaced by the key of the corresponding key-value pair. The system then provides a translation of each of the key-value pairs. The system generates a translated content item. By replacing each key in the translation template with the corresponding generated translation.

18 Claims, 7 Drawing Sheets

(56) References Cited

U.S. PATENT DOCUMENTS

| | | | | |
|---|---|---|---|---|
| 6,470,306 | B1* | 10/2002 | Pringle | G06F 40/169 |
| | | | | 715/236 |
| 7,607,085 | B1* | 10/2009 | Lassesen | G06F 9/454 |
| | | | | 709/227 |
| 7,784,026 | B1* | 8/2010 | Wong | G06F 9/454 |
| | | | | 717/109 |
| 8,868,404 | B1* | 10/2014 | Yancey | G06F 40/47 |
| | | | | 704/7 |
| 2001/0029455 | A1* | 10/2001 | Chin | G06F 40/58 |
| | | | | 704/277 |
| 2003/0131320 | A1* | 7/2003 | Kumhyr | G06F 9/454 |
| | | | | 715/205 |
| 2004/0168132 | A1* | 8/2004 | Travieso | H04L 67/02 |
| | | | | 715/201 |
| 2006/0174196 | A1* | 8/2006 | Zhang | G06F 9/454 |
| | | | | 715/236 |
| 2006/0200766 | A1* | 9/2006 | Lakritz | G06F 15/00 |
| | | | | 715/234 |
| 2007/0061129 | A1* | 3/2007 | Barreiro | G06F 40/58 |
| | | | | 704/9 |
| 2009/0192783 | A1* | 7/2009 | Jurach, Jr. | G06F 40/45 |
| | | | | 704/4 |
| 2012/0017146 | A1* | 1/2012 | Travieso | G06F 40/45 |
| | | | | 715/265 |
| 2014/0076475 | A1* | 3/2014 | Galicia | B65C 9/42 |
| | | | | 156/64 |
| 2017/0197152 | A1* | 7/2017 | Bojja | G06F 40/216 |
| 2018/0052827 | A1* | 2/2018 | Mathada | G06F 40/194 |
| 2018/0067926 | A1* | 3/2018 | Bestfleisch | G06F 40/58 |
| 2021/0294987 | A1* | 9/2021 | Leahy | G06F 16/211 |
| 2021/0312141 | A1* | 10/2021 | Shi | G06F 40/40 |

* cited by examiner

CONTENT MANAGEMENT SYSTEMS FOR PROVIDING AUTOMATED TRANSLATION OF CONTENT ITEMS

TECHNICAL FIELD

This disclosure relates generally to content management, and more particularly to systems, methods and products for automatically providing translations of content items which have non-standard formatting or content using translation services that are not adapted to process this type of content.

BACKGROUND

A page author may be tasked with creating a website using pieces of content (content items) that are stored in a repository. In some cases, the website may have a global presence, so it may be desirable to publish the website in several languages. This may involve creating a number of subdirectories within the repository, each of which contains content items that use a corresponding language. For instance, the repository may include a first directory that contains content items in a base language, such as English, and one or more subdirectories containing the same content items in localized languages (languages used in the localities in which the website will be displayed), such as French, German, Chinese, Japanese, etc.

Conventionally, the content items in the base language have to be manually translate to the different localized languages. A content item is handed off to someone who translates the base language of the content item into the localized language and then gives back a content item with the text translated from the base language to the localized language. This translated content item is then stored in the subdirectory associated with that specific localized language. The manual generation of translated content items in this manner may be time-consuming and expensive.

Several services are publicly available to translate content. These services can typically translate information in a pure text format. In this format, a text string in a first language is received from a user and is translated to produce a text string in a target language. This second text string in the target language is returned to the user. In some cases, translation services may also be able to handle more complex inputs, such as HTML documents which include one or more standardized HTML tags. This type of input can be processed by the translation service, which identifies the standardized tags and translates the content corresponding to the tags.

These translation services, however, are not able to handle translation of content items which contain non-standard or user-defined tags. For example, these services cannot handle generic XML documents. Consequently, if this type of content is submitted to one of these translation services, the service will not recognize the tags, and may attempt to translate information which was not intended to be translated. For instance, these translation services may attempt to translate the user-defined tags themselves, which could render the content item unusable. Similarly, these services may translate URLs, metadata, or other information that was not intended to be translated, thereby corrupting the content items.

SUMMARY

Embodiments of the invention include systems, methods and products for automatically translating content such as may be used by websites to support localization of the content. In embodiments of the present invention, content items to be translated are processed by one or more processors that are configured to identify translatable text in a base language, extract this text from the content item, translate the text to a desired target language using a translation service or processor that may be publicly available, and reconstruct the content item using the translated text in place of the base-language text. The reconstructed, translated content item is then stored in a repository, where it can be accessed to generate pages of the website, localized to the desired language.

Embodiments disclosed herein may therefore enable the automatic translation of content items using a translation service or translation engine that is capable of translating pure text or textual content that includes a limited set of predefined tags, where the content items include tags that are not within the set that can be handled by the translation service or engine. The disclosed embodiments thereby also enable the automated translation of content items that previously required manual processing in order to avoid translating components of the content items where translation would corrupt the information corresponding to these components.

One embodiment comprises a system for automatic translation of content items, where the system includes one or more processors that are configured to identify components of a content item to be translated (translation items) and components not to be translated (non-translation items). The system generates a key-value pair corresponding to each translation item, where the key-value pair includes a key which comprises a unique identifier and a value which comprises a text string of the translation item. The system also generates a translation template that corresponds to the content item, wherein the translation template matches the content item except that the text string of each translation item is replaced by the key of the corresponding key-value pair. The system then provides a translation of each of the key-value pairs. Finally, the system generates a translated content item based on the translation template and the generated translations, where each translation replaces the corresponding key in the translation template.

In one embodiment, the processors include a translation item markup processor, an XML tag markup processor, a text extraction and identification processor, a translation processor, and a template fill processor. The translation item markup processor is configured to identify components contained within the content item and to mark non-translation items to be skipped. In some embodiments, this processor is configured to identify translation items and non-translation items by, for each of the content items, identifying a corresponding content item template and identifying translation items and non-translation items according to tagging defined by the content item template. The XML tag markup processor is configured to identify tags of translation items and to mark tags of the translation items to be skipped. The text extraction and identification processor is configured to, for each translation item, identify text of the translation item, associate a corresponding unique identifier with the identified text, and generate a translation template in which the text of each translation item is replaced with the corresponding unique identifier. The translation processor is configured to provide the text of each translation item to a translation engine and to receive a corresponding translation which is associated with the unique identifier of the text of the translation item. The translation processor may be configured to provide the text of each translation item to the translation engine of a publicly available translation service via an API of the service. Each translation item may be contained in a concatenation of the key-value pairs, each pair including the text of a corresponding one of the translation items and the corresponding unique identifier. The template fill processor is configured to, for each unique identifier, replace the unique identifier in the translation template with the translation corresponding to the unique identifier, thereby producing a translated content item. The processors are configured in some embodiments to maintain the status of translation of the base-language content item in a translation processing data object, each processor updating the translation processing data object with information associated with the processing performed by that processor. In one embodiment, the translation processing data object is updated by the text extraction and identification processor to contain the translation template.

An alternative embodiment comprises a method for automatic translation of a content item. This method includes identifying components of a base-language content item to be translated (translation items) and components of the base-language content item not to be translated (non-translation items), generating a key-value pair corresponding to each of the translation items, where each key-value pair includes a key which comprises a unique identifier and a value which comprises a text string of the translation item, generating a translation template that corresponds to the base-language content item, where the translation template matches the base-language content item except that the text string of each translation item is replaced by the key of the corresponding key-value pair, providing, for each of the key-value pairs, a corresponding translation, and generating a translated content item based on the template and the generated translations, where each translation replaces the corresponding key in the translation template.

In some embodiments, providing the translation comprises, for each key-value pair, tagging the key to skip translation of the key, submitting the tagged key-value pair to a translation engine, and receiving from the translation engine a translated key-value pair comprising the tagged key and a corresponding translated value. The tagged key-value pair may be submitted to a publicly available translation processor via an API of the translation processor, where multiple tagged key-value pairs are concatenated and the resulting concatenation of the tagged key-value pairs is provided to the translation processor in a single API call. In some embodiments, the translation item for one or more of the translation items comprises a user-defined tag and a text string which is unknown to the translation processor. In some embodiments, the translation items and the non-translation items may be identified by identifying a content item template corresponding to the base-language content item, where the content item template includes a set of tag definitions for tagged items in the base-language content item, and for each of the tagged items determining whether the tagged item is a translation item or a non-translation item based on the identified set of tag definitions. The method may also include maintaining the status of the translation of the base-language content item in a translation processing data object. The method may be performed in a batch mode in which a plurality of base-language content items are automatically translated and stored without user intervention, or it may be performed in an individual translation mode in which the base-language content item and the translated content item are displayed side-by-side in one or more windows of a user interface. In some embodiments, the base-language content item is replaced with the translated content item.

Another alternative embodiment comprises a computer program product in which a non-transitory computer-readable medium which stores instructions executable by one or more processors to perform a method including identifying components of a base-language content item to be translated (translation items) and components of the base-language content item not to be translated (non-translation items), generating a key-value pair corresponding to each of the translation items, where each key-value pair includes a key which comprises a unique identifier and a value which comprises a text string of the translation item, generating a translation template that corresponds to the base-language content item, where the translation template matches the base-language content item except that the text string of each translation item is replaced by the key of the corresponding key-value pair, providing, for each of the key-value pairs, a corresponding translation, and generating a translated content item based on the template and the generated translations, where each translation replaces the corresponding key in the translation template.

Numerous alternative embodiments may also be possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Embodiments of the invention include systems, methods and products for automatically translating content such as may be used by websites to support localization of the content. Websites may have global reach, so it may be desirable to provide content in different languages in order to allow users in different localities to view the website in a language suitable for that locality (i.e., to "localize" the content, or the website). For example, when a particular website is viewed by a user in the United States, it may be desirable to present the information in English, but when the website is viewed by a user who is in France, it may be preferable to present the information on the website in French.

Figure 1:
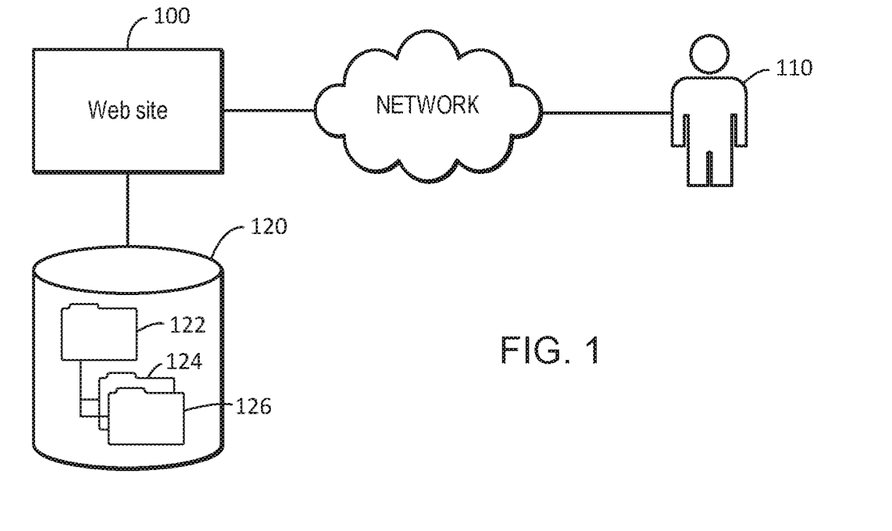
FIG. 1 is a diagrammatic illustration of a web site that uses a hierarchical directory structure to enable the web site to be localized to areas using different languages.

This may be achieved by providing different versions of the content items used by the website, where each version is in a different language. This is illustrated by FIG. 1. In this figure, a website 100 is accessible by a user 110. The pages that are presented to user 110 by website 100 are generated using content that is stored in a repository 120. As depicted in the figure, the content items that are used by the website are stored in a directory structure 122 that may include a number of subdirectories (e.g., 124, 126). Each of these subdirectories includes content items that use a corresponding language. For example, subdirectory 124 may include content items that contain English text, subdirectory 126 may include content items with French text, and so on. Subdirectories may be provided for as many different languages as are desired.

Each of the subdirectories may include content items which are the same, except for the language. When user 110 accesses website 100, the location of the user may be identified so that an appropriate language for that location may be selected. Alternatively, the user may manually select a preferred language or location. Based upon the identified language, website 100 accesses a corresponding one of the content subfolders in repository 120. For instance, if English is selected, the website will access content items in subdirectory 124. Alternatively, if French is selected, the website will access content items in subdirectory 126. The website will therefore be presented to the user in the language corresponding to the selected directory, but will otherwise have the same appearance.

Figure 2:
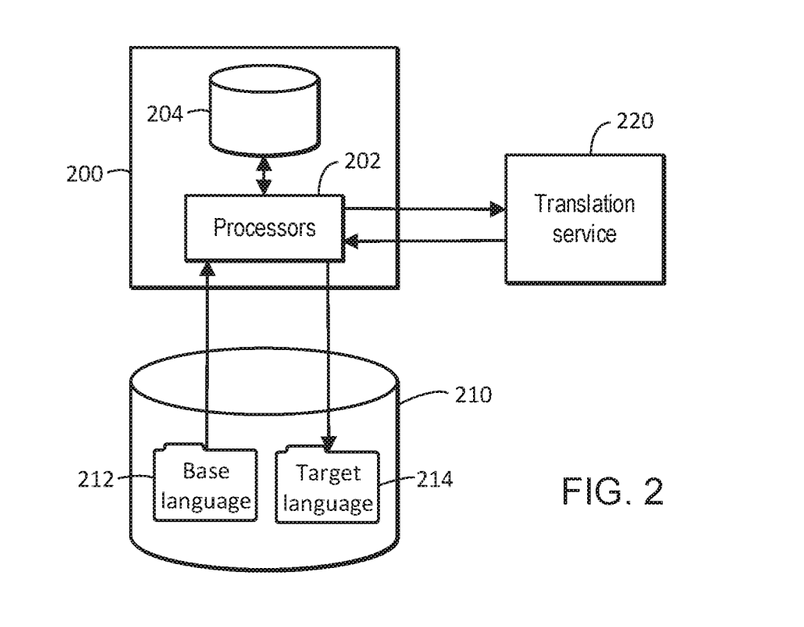
FIG. 2 is a diagrammatic illustration of a system for translation of content items in accordance with some embodiments.

Referring to FIG. 2, a diagram illustrating a system for translation of content items in accordance some embodiments is shown. In this embodiment, a translation system 200 is coupled to a content repository 210. Translation system 200 is configured to receive content items that are contained in a first directory 212. These items contain text in a base language, such as English. (It should be noted that, although English is used as the base language in the examples herein, these examples are merely illustrative, and any language may be the base language.)

The base-language content items are provided to one or more processors 202 in the translation system which are configured to identify individual components of the content items and to determine which of the components are to be translated, and which of the components are not to be translated. For the purposes of this disclosure, components of the content item which are to be translated may be referred to as "translation items", and components which are not to be translated may be referred to as "non-translation items".

The processors identify text within the translation items and extract this text. Unique identifiers are associated with each piece of extracted text to form key-value pairs (where the unique identifier is the key and the text is the value) which may be stored in a data store 204 within the system. The key-value pairs are marked with tags to identify the keys as non-translatable information. The tags are defined by a translation service 220, and the specific tags that are used in a given embodiment are dependent upon the specific translation service that is used. In one embodiment, the tags are HTML tags that are identifiable by the translation service to indicate that the tagged information is to be skipped during translation.

In addition to generating the key-value pairs, processors 202 generate a translation template. This template will be used in conjunction with translation of the key-value pairs to generate the translated content item. The translation template is identical to the original content item which is being translated, except that the text which is to be translated is replaced in the translation template with corresponding unique identifiers (i.e., the keys of the key value pairs).

The marked key-value pairs are provided by processors 202 to translation service 220. In one embodiment, all of the key-value pairs for a content item are concatenated into a single text string that includes all of the key-value pairs. Translation service 220 processes this text string, skipping portions of the string which are identified by the skip-translation tags and translating the remainder of the string from the base language to the target language. The resulting string includes all of the key-value pairs, with the keys remaining unchanged from the input string, and the values translated to the target language.

The translated string is returned to processors 202. For each of the translated key-value pairs, the processors identify the key (unique identifier) in the translation template and replace the key with the corresponding value (the translated text). When all of the keys in the translation template have been replaced with corresponding translated text, the resulting translated content item is provided to content repository 210, and is stored in the directory 214 corresponding to the target language. The translated content item is then available for use by the website.

Figure 3:
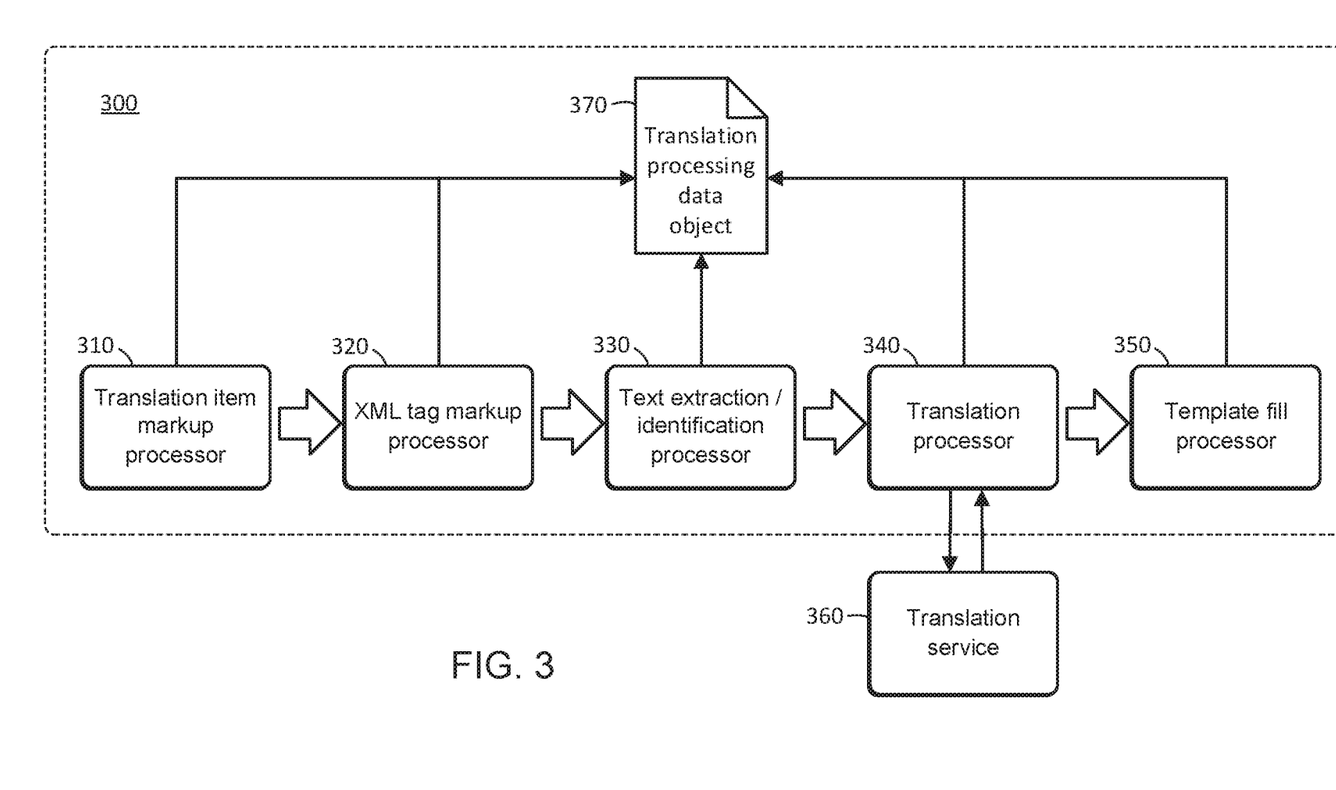
FIG. 3 is a diagrammatic illustration of a system for translation of content items using a chain of processors and a translation service in accordance with some embodiments.

The automatic translation system may be implemented in many different ways, but an exemplary embodiment is illustrated in FIG. 3. In this figure, system 300 uses a chain of five processors which perform the different stages of the translation of each content item. In this embodiment, the actual translation of text strings is performed by an external translation service, such as Google Translate, which is accessed through a corresponding API (Google Translation Cloud API). In alternative embodiments, the translation may be performed by a translation server which is contained within the system.

In this embodiment, a content item to be translated is serially processed by each of the processors in the system, with the output of one processor serving as the input to the next processor. Processors 310, 320 and 330 perform preprocessing of the content item to identify and extract text strings within the content item and to generate a translation template, processor 340 interfaces with the external translation processor to obtain translations of the text strings, and processor 350 performs post-processing to construct a translated content item using the translated text strings and the translation template generated during preprocessing. During each of the processing steps, a translation processing data object 370 corresponding to the content item is maintained to track the processing and to store data associated with the processing. The functions of each of the processors are explained in more detail below.

When a content item is to be translated, the content item is provided to translation item markup processor 310. This processor is configured to identify components of the content item as translation items or non-translation items. The translation items are components of the content items that are intended to be translated. For example, titles, articles, headlines and other text fields are considered to be translation items. Non-translation items are components of the content items that are not intended to be translated. These may include components such as URLs or metadata that would not be identifiable by the translation service or might be corrupted by translation.

When a content item is received by translation item markup processor 310, the processor looks up a content item template corresponding to the content item. The content item template defines the various components that may be included in the content item, and specifies whether each of these components are translation items or non-translation items. An example of a content item template is provided below.

Example Content Item Template
```
<?xml version="1.0" encoding="UTF-8" standalone="no"?>
<!DOCTYPE data-capture-requirements SYSTEM "datacapture6.0.dtd">
<!--
  datacapture.cfg
  Generated by ContentTemplate Builder
-->
<data-capture-requirements>
<ruleset>
  <script language="javascript">
    /**
     * Initializes the FormAPI objects.
     */
    function init( )
    {
    return true;
    }
    /**
     * OnSave handler.
     */
    function handleOnSave(obj)
    {
    return true;
    }
    /**
     OnSaveDone handler.
     */
    function handleOnSaveDone(obj)
    {
    return true;
    }
    // form handlers
    IWEventRegistry.addFormHandler("onFormInit", init);
    IWEventRegistry.addFormHandler("onSave", handleOnSave);
    IWEventRegistry.addFormHandler("onSaveDone", handleOnSaveDone);
  </script>
  <root-container name="Root" location="Root" furl="no">
    <item name="Newtextarea_583" pathid="Newtextarea_583">
      <label>My Text Area</label>
      <textarea required="f" rows="0" cols="0" hinttext="textarea"/>
    </item>
    <item name="Newtextfield_731" pathid="Newtextfield_731">
      <label>My Text Field</label>
      <text required="f" size="0" maxlength="0" hinttext="text"/>
    </item>
    <item name="Newbrowser_860" pathid="Newbrowser_860">
      <label>My File Browser</label>
      <browser size="0" maxlength="0" initial-dir="/" ceiling-dir="/"/>
    </item>
  </root-container>
</ruleset>
</data-capture-requirements>
```

The content item template therefore defines three types of components, the first two of which are translation items and the last of which is a non-translation item:

Item Type: textarea
Skip Translation: No
XPath: /Root/Newtextarea_583
Item Type: text
Skip Translation: No
XPath: /Root/Newtextfield_731
Item Type: browser
Skip Translation: Yes
XPath: /Root/Newbrowser_860

After the content item template is identified, the processor iterates through the content item and matches the components of the content item to the corresponding definitions in the content item template. If the content item template defines the component as a non-translation item, the component is marked to be skipped. In one embodiment, non-translation items are surrounded by marks [!!] and [/!!], Although any suitable tag or means for marking may be used. The output of translation item markup processor 310 is a version of the content item in which non-translation items are surrounded by these marks.

An example is provided below to illustrate the processing performed by translation item markup processor 310. The processing is performed on a content item that is shown below. The processing performed by each of processors 310-350 will be illustrated using this content item as an example.

Example Content Item
```
<?xml version="1.0" encoding="UTF-8"?>
```

```
<Root>
    <Newtextarea_583>This is the text area used for user
        input.</Newtextarea_583>
    <Newtextfield_731>Demo text field.</Newtextfield_731>
    <Newbrowser_860>/img/mobilebanking-phone.jpg</Newbrowser_860>
</Root>
```

The content item corresponds to the exemplary content item template shown above. The content item is therefore processed based on the exemplary content item template to identify and mark non-translation items within the content item. In this example, the components having XPaths /Root/Newtextarea_583 and /Root/Newtextfield_731 are translatable, while the component having XPath /Root/Newbrowser_860 is non-translatable. The value of the /Root/Newbrowser_860 component (/img/mobilebanking-phone.jpg) is therefore surrounded by [!!] and [/!!] marks. The resulting output is shown below.

Output of Translation Item Markup Processor

```
<?xml version="1.0" encoding="UTF-8"?>
<Root>
    <Newtextarea_583>
        This is the text area used for user input.
    </Newtextarea_583>
    <Newtextfield_731>
        Demo text field.
    </Newtextfield_731>
    <Newbrowser_860>
        [!!]/img/mobilebanking-phone.jpg[/!!]
    </Newbrowser_860>
</Root>
```

In addition to generating the above output, translation item markup processor 310 updates a translation processing data object with information relating to the translation of the content item. In one embodiment, this information includes the locale to which the content item is being translated, as well as the XPaths of the non-translation items that will be skipped in the translation. An example of the translation processing data object updated for the example above is shown below.

Translation Processing Data Object (at Component Markup)
  locale:"zh"
  xpathMapToSkipTranslation:Map("/Root/Newbrowser_860","false")
  textTemplate:
  translationData:

The output of translation item markup processor 310 is provided as an input to XML tag markup processor 320. XML tag markup processor 320 is configured identify XML tags that are contained in this input. Processor 320 surrounds the XML tags with the same [!!] and [/!!] marks that were used by translation item markup processor 310. XML tag markup processor 320 thereby identifies the XML tags as information that is not to be translated. Thus, if XML tag markup processor 320 receives as input the above identified example output of processor 310, it would produce the output shown below. It can be seen in this example that all of the information in the output is marked to be skipped during translation (surrounded by [!!] and [/!!] marks), except for the two text strings "This is the text area used for user input." and "Demo text field.".

Output of XML Tag Markup Processor
  [!!]<?xml version="1.0" encoding="UTF-8"?>[/!!]
  [!!]<Root>[/!!]
    [!!]<Newtextarea_583>[/!!]
      This is the text area used for user input.
    [!!]</Newtextarea_583>[/!!]
    [!!]<Newtextfield_731>[/!!]
      Demo text field.
    [!!]</Newtextfield_731>[/!!]
    [!!]<Newbrowser_860>[/!!]
      [!!]/img/mobilebanking-phone.jpg[/!!]
    [!!]</Newbrowser_860>[/!!]
  [!!]</Root>[/!!]

In this exemplary embodiment, XML tag markup processor 320 does not update the translation processing data object which is associated with the content item being translated. In other embodiments, however, processor 320 may update this data object. For example, XML tag markup processor 320 may update the translation processing data object to indicate that the XML tag markup is being (or has been) performed with respect to the content item being processed. The translation processing data object at this stage of the processing is as shown above at the component markup stage.

The output of XML tag markup processor 320 is provided as an input to text extraction and identification processor 330. Processor 330 is configured to extract the text from the received input, while ignoring the non-translation items and the XML tags in the input. Text extraction and identification processor 330 is also configured to generate a template based on this input which will be used following translation of the extracted text to construct a translated content item corresponding to the original content item.

Text extraction and identification processor 330 examines the received input and, as each piece of text (text string) is extracted from the input, it is assigned a corresponding unique identifier. The identifier and corresponding text string form a key-value pair (the unique identifier being the key, and the text string being the value). The key-value pairs are provided to translation processor 340 so that the text of each key-value pair can be translated.

In this embodiment, the unique identifier of the key-value pair is marked by tags which are defined by the translation service that will be used to translate the text strings. In the case of the Google Translation Cloud service, the tags <span translate="no"> and </span> are used. (If a different translation service is used, the tags that are defined by that service for marking information to be translated and information to be skipped would be used.) The respective tags are inserted before and after the unique identifier so that when the key-value pair (the unique identifier and the corresponding text string) is provided to the translation service, it will ignore the unique identifier and translate the text string. In one embodiment, all of the key-value pairs for a content item are concatenated or included in a single file so that they can be submitted to the translation service as a single unit, which may be more efficient and less costly than submitting them to the service individually. The output of text extraction and identification processor 330 for the above example input is shown below.

Output of Text Extract and Identification Processor
  <span translate="no">IW_TRANS_ID_0_IW</span>
  <tr> This is the text area used for user input.</tr>
  <span translate="no">IW_TRANS_ID_1_IW</span>
  <tr>Demo text field.</tr>

In addition to extracting the text from the received input, text extraction and identification processor generates a translation template that will be used in conjunction with the translated key-value pairs to construct a translated content item. The translation template is generated by replacing, in the received input, the text with the corresponding unique identifier. In this embodiment, text extraction and identification processor 330 updates the translation processing data object by adding the translation template to the object. The resulting updated translation processing data object (with the template following "textTemplate:") is shown below.

Translation Processing Data Object (at Text Extract and Identification)
locale:"zh"
xpathMapToSkipTranslation:Map("/Root/Newbrowser_860","false")
textTemplate:
   <?xml version="1.0" encoding="UTF-8"?>
   <Root>
      <Newtextarea_583>IW_TRANS_ID_0_IW</Newtextarea_583>
      <Newtextfield_731>IW_TRANS_ID_1_IW</Newtextfield_731>
      <Newbrowser_860>/img/mobilebanking-phone.jpg</Newbrowser_860>
   </Root>
translationData:

The output of text extraction and identification processor 330 is provided as an input to translation processor 340. As noted above, this input includes each of the key-value pairs, with the unique identifier of each pair marked to be skipped during translation, and the corresponding text string marked to be translated. Because the markings used by the system to identify the unique identifiers and text strings are determined by the specific translation service 360 that will be accessed by the system, the key-value pairs are ready to be submitted directly to the translation service.

Translation processor 340 then accesses translation service 360 through a corresponding API. In one embodiment, the translation processor specifies in the API call the target language for the translation. Translation service 360 processes the received key-value pairs and, in this case, identifies the base language of the received text strings. The translation service then translates the text strings (in this case identified by the <tr> and </tr>tags) from the base language to the target language. Because the unique identifiers are surrounded by the <span translate="no"> and </span>tags, they are skipped (i.e., not translated) by translation service 360. Translation service 360 then returns to translation processor 340 the translated key-value pairs as shown below.

Output of Translation Processor
<span translate="no">IW_TRANS_ID_0_IW</span>
<tr> 这是用于用户输入的文本区域。</tr>
<span translate="no">IW_TRANS_ID_1_IW</span>
<tr> 演示文本字段。</tr>

Translation processor 340 in this embodiment also updates the translation processing data object with the information received from the processing service. This information includes an identifier of the base language of the original text strings (in this example, English or "en"), as well as the translated key-value pairs. The updated translation processing data object is shown below.

Translation Processing Data Object (at Translation)
locale:"zh"
xpathMapToSkipTranslation:Map("/Root/Newbrowser_860", "false")
textTemplate:
   "<?xml version="1.0" encoding="UTF-8"?>
   <Root>
      <Newtextarea_583>IW_TRANS_ID_0_IW</Newtextarea_583>
      <Newtextfield_731>IW_TRANS_ID_1_IW</Newtextfield_731>
      <Newbrowser_860>/img/mobilebanking-phone.jpg</Newbrowser_860>
   </Root>"
translationData:
{
detectedSourceLanguage:"en"
translatedText:
   "<span translate="no">IW_TRANS_ID_0_IW</span>
   <tr> 这是用于用户输入的文本区域。</tr>
   <span translate="no">IW_TRANS_ID_1_IW</span>
   <tr> 演示文本字段。</tr>
}

The output of translation processor 340 is provided as an input to template fill processor 350. Template fill processor 350 accesses the translation processing data object to obtain the translation template that was previously generated by the text extraction and identification processor. Template fill processor 350 then generates a translated content item by identifying each of the unique identifiers in the translation template and replacing each unique identifier with the corresponding translated text string from the translated key-value pairs received from translation processor 340. Thus, for example, unique identifier IW_TRANS_ID_0_IW is replaced by the string 这是用于用户输入的文本区域.. The resulting translated content item is provided as the output of template fill processor 350. This output for our example is shown below.

Output of Template Fill Processor
<?xml version="1.0" encoding="UTF-8"?>
<Root>
   <Newtextarea_583>
      这是用于用户输入的文本区域。
   </Newtextarea_583>
   <Newtextfield_731>
      演示文本字段。
   </Newtextfield_731>
   <Newbrowser_860>
      /img/mobilebanking-phone.jpg
   </Newbrowser_860>
</Root>

In this exemplary embodiment, it is not necessary for template fill processor 350 to make any changes to the translation processing data object.

Figure 4:
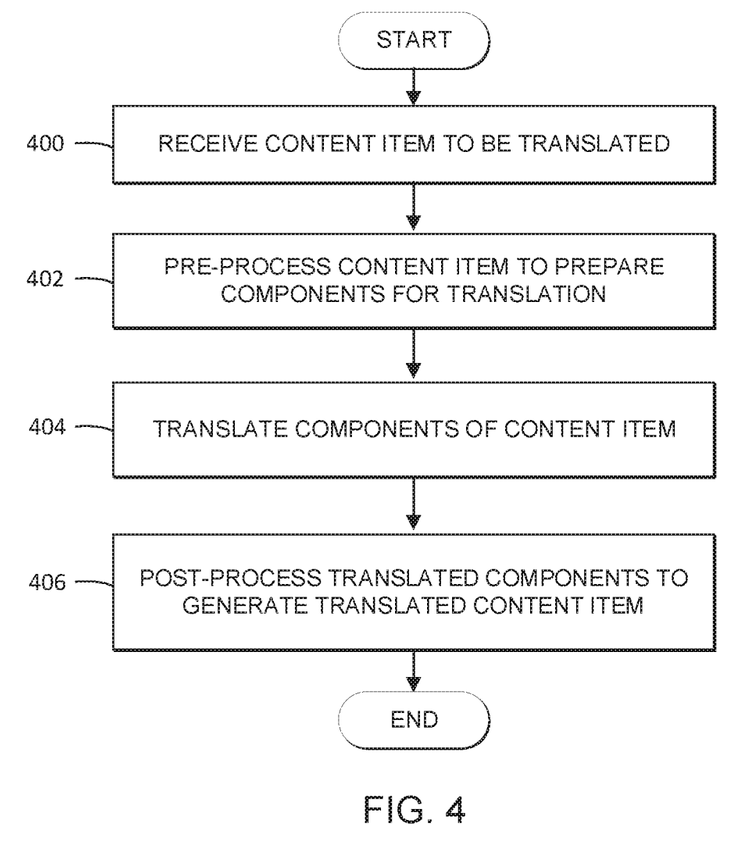
FIG. 4 is a flow diagram illustrating the operation of a content item translation system in accordance with some embodiments.
Figure 5:
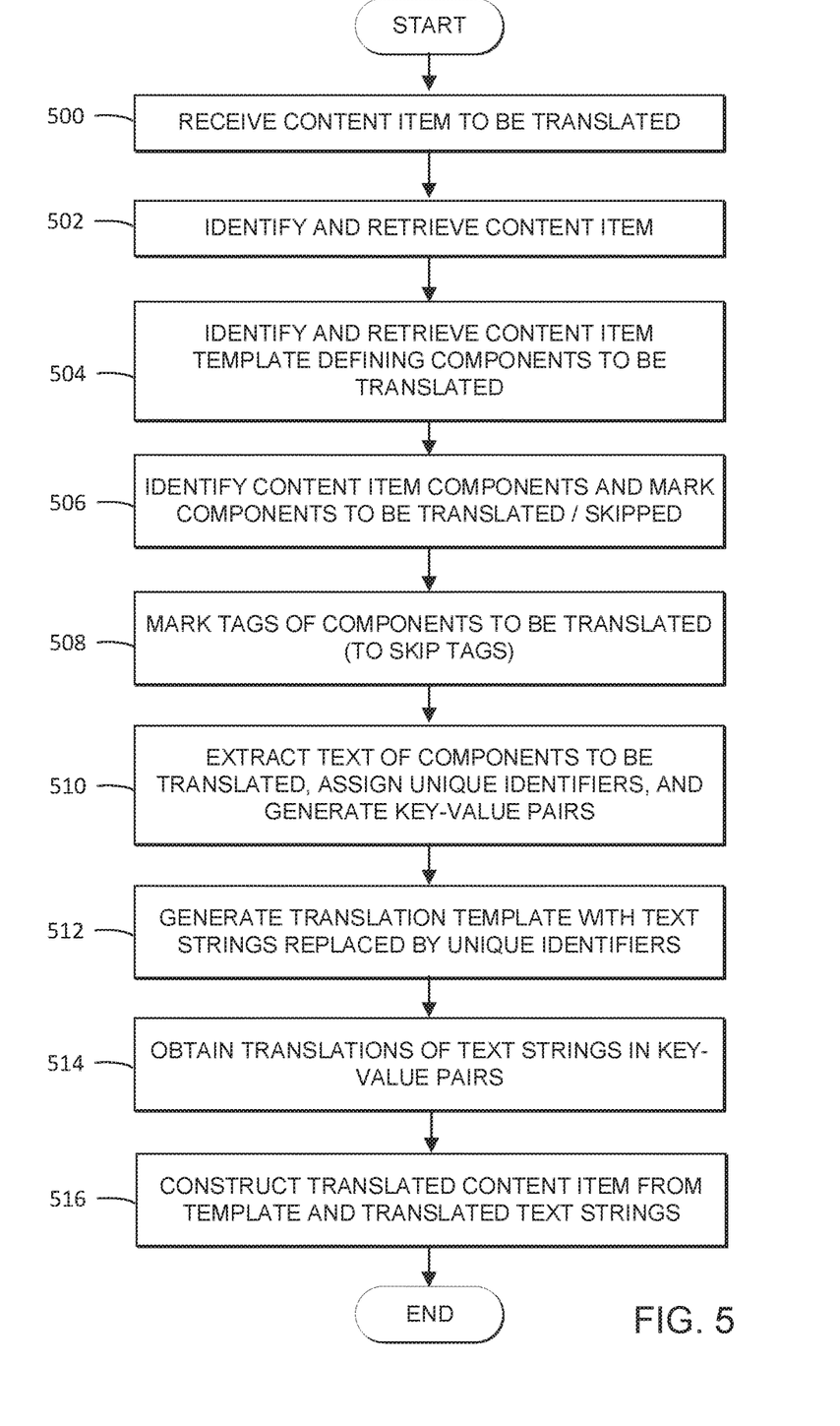
FIG. 5 is a flow diagram illustrating in more detail the operation of a content item translation system in accordance with some embodiments.

Thus, the operation of the system above can be summarized by the flow diagrams of FIGS. 4 and 5. FIG. 4 depicts the operation of the system at a high level, while FIG. 5 illustrates the system's operation in more detail.

Referring to FIG. 4, the system first receives or identifies a content item to be translated (400). The system then preprocesses the content item to prepare it for translation (402). In some embodiments, this includes identifying text within the content item that is to be translated, extracting this text to form a set of key-value pairs in which each text string is associated with a corresponding unique identifier, and generating a translation template that will be used in conjunction with the translated text strings to generate a new content item using the target language. The text strings extracted from the content item are then provided to a translation service or translation engine which translates the text strings from a base language to a target language (404). Finally, the translated text strings are inserted into the translation template in place of the corresponding unique identifiers to generate the translated content item (406).

Referring to FIG. 5, after the content item to be translated is received (500), the preprocessing of the content item begins with an identification of the content item's type (502). Based on the identified type, the system identifies and retrieves a corresponding content item template that defines which of the components of the content item are to be translated, and which of the components are to be skipped (not translated) (504). Using the content item template, the content item is examined, and for each component of the content item, the system identifies a corresponding tag, looks up the tag in the content item template to determine whether or not the corresponding component will be translated, and marks one or more of the components to identify which of the components will be translated, and which ones will not be translated (506). It should be noted that, while the example above marks components that are not to be translated (e.g., with the [!!] and [/!!] tags), other embodiments may mark the components that are to be translated.) After the content item components have been examined and marked up, the system identifies components that are to be translated, and further marks the tags of these components so that the tags themselves will not be translated (508).

At this point, the content item is marked up so that it identifies portions (text strings) of the content items that are to be translated, and portions that are to be skipped. For each of the individual text strings to be translated, the system extracts each text string from the content item, assigns a unique identifier to the text string and saves the identifier and corresponding text string as a key-value pair (510). In one embodiment, all of the key-value pairs are stored in a single document, with markings to identify the keys (unique identifiers) so that they will be skipped during translation. The system also generates a translation template (512) by replacing each extracted text string in the marked content item within the corresponding unique identifier, and removing the markings so that the translation template is identical to the content item, except that the text strings to be translated are replaced by the corresponding unique identifiers.

The document containing the marked key-value pairs (unique identifiers and corresponding text strings) is then provided to a translation service or engine for translation of the text strings (514). The key-value pairs may be provided to an external translation service (e.g., a publicly available service such as Google translate) using an appropriate API call (e.g., a Google Translation Cloud API call), or they may be processed by a translation engine which is internal to the system to translate the text strings from the base language to the target language (while skipping the marked identifiers). The translation service in some embodiments returns the translated text strings in the same format in which they were received (i.e., marked identifiers and corresponding text strings). The system then combines the translated text strings with the translation template, substituting the translated text strings for the corresponding unique identifiers in the template, thereby generating a new content item in which the text strings have been translated to the target language (516). This translated content item is saved in the subdirectory corresponding to the target language.

It should be noted that, while the examples above involve the creation of a new, translated content item corresponding to the originally selected content item, some embodiments may be configured to modify the existing content item by translating the text strings to the target language. In such embodiments, it is anticipated that and original content item that uses a base language will be copied to a subdirectory for a different locality, then the copy of the content item will be localized by modifying it to replace the base-language text strings in the content item with the target-language text strings.

The systems and methods described above may be configured to use various different processing modes. For example, the system may allow the user to select either a side-by-side processing mode in which a single content item is translated and displayed to a user beside the original content item, or in a batch processing mode in which one or more content items are successively translated in the background and stored in a target directory without being displayed to the user. These modes are described in more detail below.

Figure 6:
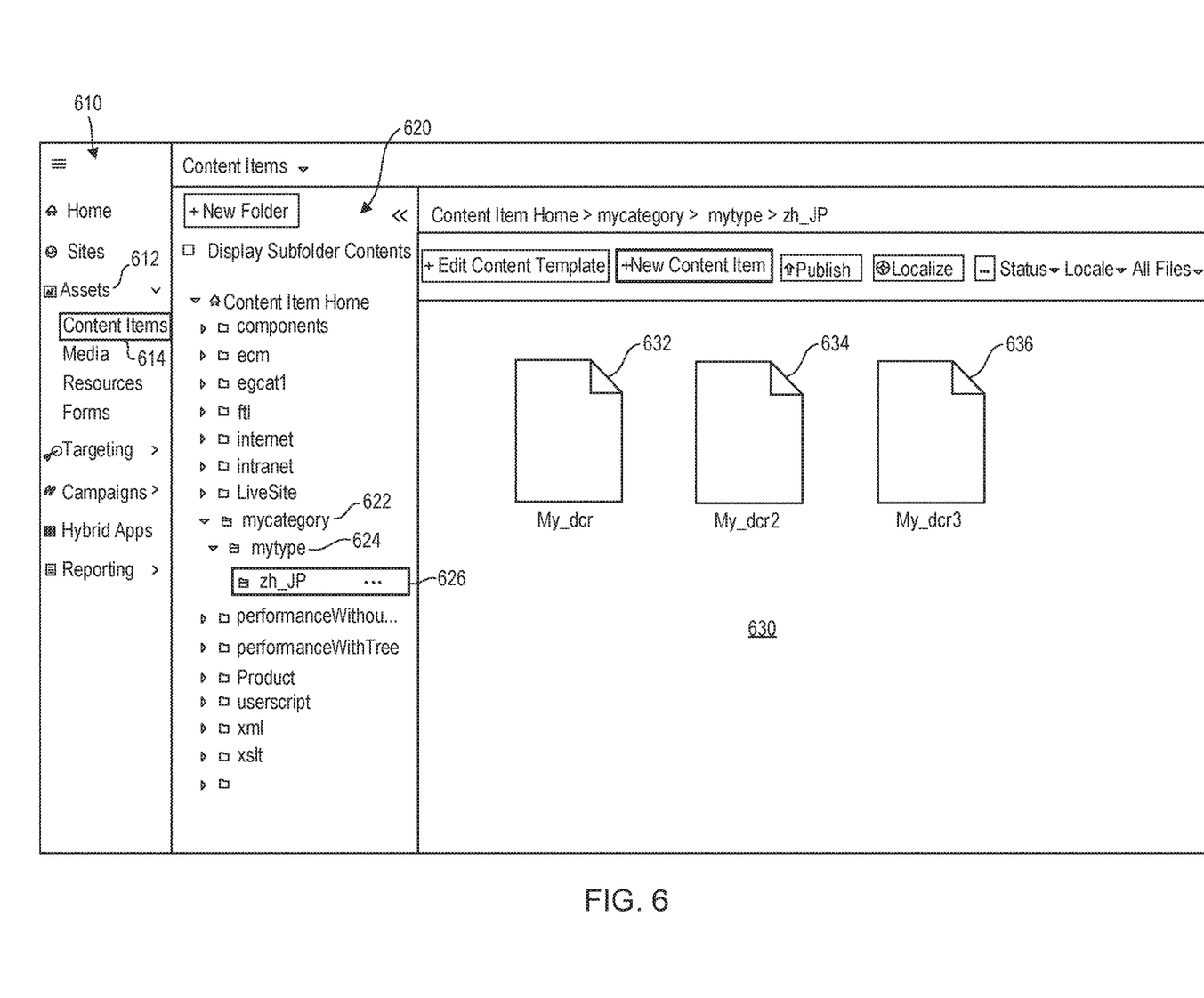
FIG. 6 is a diagrammatic illustration of a user interface in accordance with some embodiments.

Referring to FIG. 6, a diagram illustrating a user interface in accordance with some embodiments is shown. This figure depicts an interface window which is displayed to a user and from which the user can select content items for translation by the system. The interface includes a left panel 610 in which the user can select a collection of digital assets 612 that may include content items 614, media resources or forms. When content items 614 are selected, a second panel 620 is displayed. Panel 620 shows a hierarchical directory structure that includes the directory mycategory (622) and subdirectory mytype (624). Subdirectory mytype (624) includes a subdirectory zh_us (626). When subdirectory zh_us which (626) is selected, the contents of the subdirectory (content items 632, 634, 636) are displayed in a window 630.

Subdirectory zh_us (626) is a folder which stores content items 632, 634, 636 for a localized version of a website. These content items initially contain text strings which are in a base language, so the content items need to be translated to a target language associated with the subdirectory zh_us (626). In this embodiment, the system provides two modes for translating content items, one of which provides an immediate translation of an individual content item with a side-by-side display of the original and translated content items, and the other of which provides batch translation of one or more items in the background without displaying the translations to the user.

Figure 7:
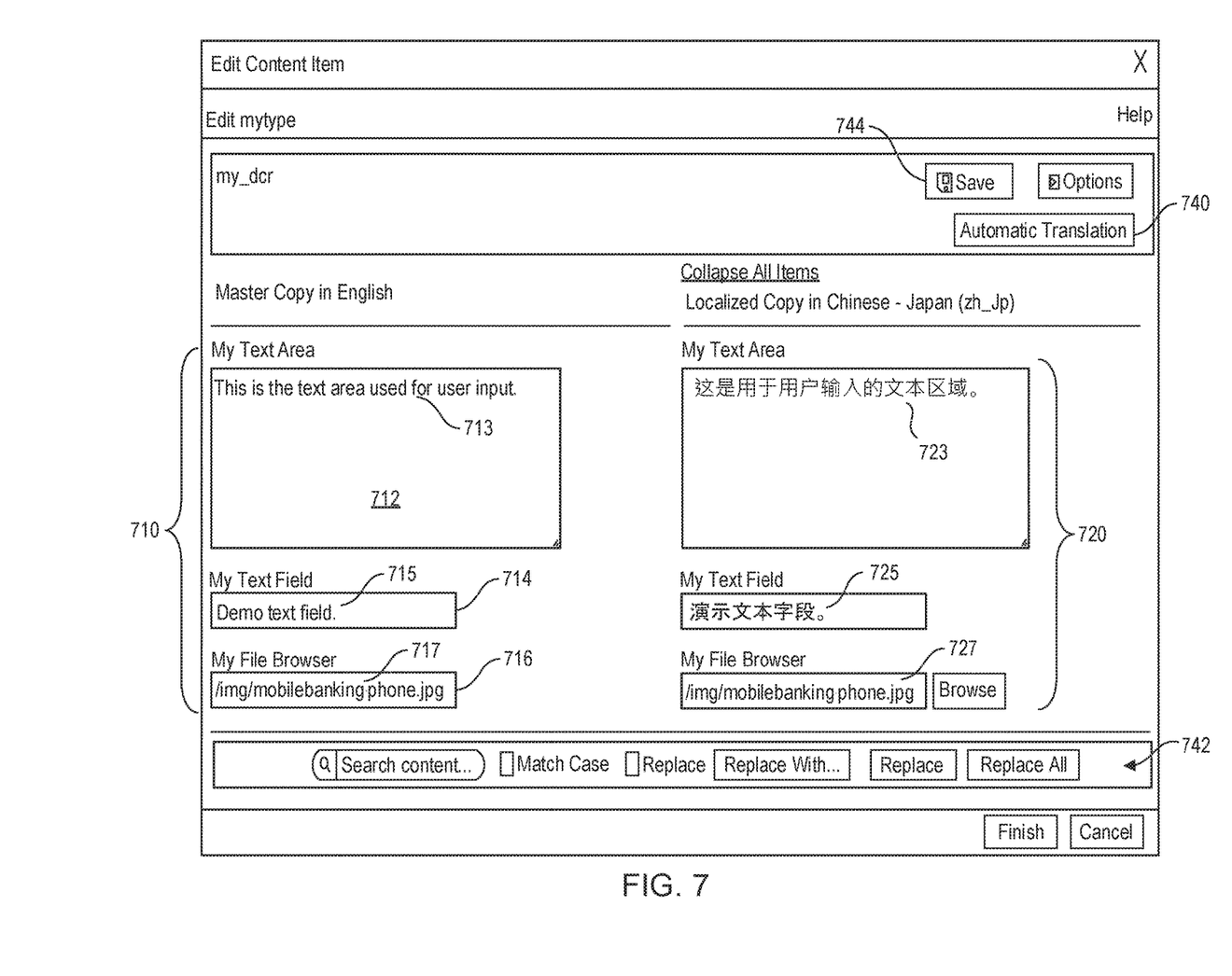
FIG. 7 is a diagrammatic illustration of a user interface for side-by-side translation of content items in accordance with some embodiments.

The user may select the immediate translation by, for example, right-clicking on one of the content items (e.g., item 632) to display a set of options for accessing the content item, and selecting an edit option. Selecting this option causes a translation interface window to be displayed, as shown in FIG. 7. In this embodiment, the interface window includes a left column 710 corresponding to the initial, English copy of the content item, and a right column 720 corresponding to a translated, Chinese copy of the content item. Each of the right and left portions of the interface includes a portion corresponding to each of the components of the content item. As in the example above, the content item includes three components: "My Text Area" (712); "My Text Field" (714); and "My File Browser" (716). "My Text Area" and "My Text Field" each includes a corresponding text string (713, 715) to be translated. "My File Browser" contains a link (717) to an image which is not to be translated.

In this embodiment, the system is configured to automatically translate the content item (as indicated by control 740). The system uses the process described above to identify the components of the selected content item (my_dcr) and to translate those components which are indicated by the corresponding content item template to be translatable, while skipping those which are indicated to be non-translatable. The results of the translation are shown in right column 720. It can be seen that the text strings in the "my text area" and "my text field" components have been translated (723, 725), while the link to the image (727) has not been translated.

The interface in this embodiment includes a number of controls to allow the user to interactively modify the content item. For instance, control 742 are provided to allow the user to search and/or replace characters within the text strings. The interface may also enable the user to edit the text strings directly within the windows that display the components of the content item. When the user is satisfied with the translation, the translated content item may be saved (744).

Figure 8:
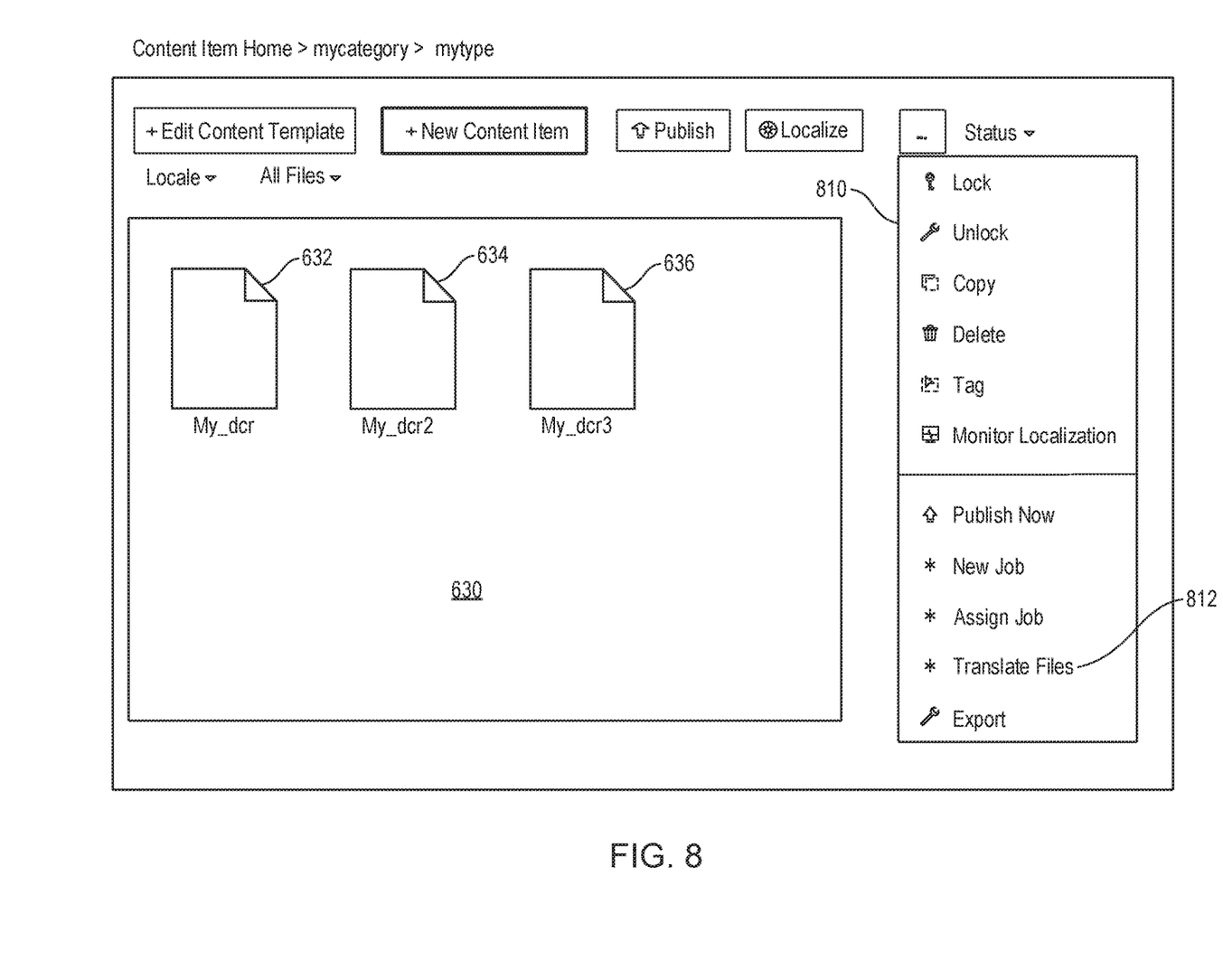
FIG. 8 is a diagrammatic illustration of a user interface for batch translation of content items in accordance with some embodiments.

As an alternative to the immediate, side-by-side translation mode, the user may choose to have one or more content items translated using a batch or bulk translation mode. Referring to FIG. 8, a diagram is provided to illustrate an example of the user interface when the batch translation mode is selected. In the batch translation mode, the user selects a set of content items within the target directory (zh_us) that are displayed within window 630. In this example, content items my_dcr (632) and my_dcr2 (634) are selected. The user then selects a drop-down menu 810 which includes a number of potential actions including "translate files" (812).

When the "translate files" action is selected, the system begins translating the selected content items (632, 634) in a batch mode. In this mode, each of the selected content items is sequentially translated using the methods described above. That is, a first one of the content items is translated, then the next is translated, and so on, until all of the selected content items have been translated. In some embodiments, translation in the batch mode is performed in the background, and the translations are not displayed to the user as they are generated. No interaction or intervention by the user is required. As the translation for each content item is completed, the translated content item is available to be accessed. In some embodiments, an indicator may be provided to the user to show that the translations of the selected content items has been completed.

Embodiments of the technology may be implemented on a computing system. Any suitable combination of mobile desktop, server machine, embedded or other types of hardware may be used. One exemplary embodiment may be implemented in a distributed network computing environment. The computing environment in this embodiment may include a client computer system and a server computer system connected to a network (e.g., a local area network (LAN), a wide area network (WAN) such as the Internet, mobile network, or other type of network or combination thereof). The network may represent a combination of wired and wireless networks that network computing environment may utilize for various types of network communications.

The computer systems may include, for example, a computer processor and associated memory. The computer processor may be an integrated circuit for processing instructions, such as, but not limited to a CPU. For example, the processor may comprise one or more cores or micro-cores of a processor. The memory may include volatile memory, non-volatile memory, semi-volatile memory or a combination thereof. The memory, for example, may include RAM, ROM, flash memory, a hard disk drive, a solid-state drive, an optical storage medium (e.g., CD-ROM), or other computer readable memory or combination thereof. The memory may implement a storage hierarchy that includes cache memory, primary memory or secondary memory. In some embodiments, the memory may include storage space on a data storage array. The client computer system may also include input/output ("I/O") devices, such as a keyboard, monitor, printer, electronic pointing device (e.g., mouse, trackball, stylus, etc.), or the like. The client computer system may also include a communication interface, such as a network interface card, to interface with the network.

The memory may store instructions executable by the processor. For example, the memory may include an operating system, a page editing or processing program (e.g., a web browser or other program capable of rendering pages), a server program configured to extend the functionality of the page processing program or other server code. Further, the memory may be configured with a page processable (e.g., capable of being rendered by) by the page editing program. The page may be the local representation of a page, such as a web page, retrieved from the network environment. As will be appreciated, while rendering the page, the page editing/processing program may request related resources, such as style sheets, image files, video files, audio files and other related resources as the page is being rendered and thus, code and other resources of the page may be added to the page as it is being rendered. Application server code can be executable to receive requests from client computers, generate server page files from a set of page assets (e.g., complete web pages, page fragments, scripts or other assets) and return page files in response. A page file may reference additional resources, such as style sheets, images, videos, audio, scripts or other resources at a server computer system or at other network locations, such as at additional server systems.

According to some embodiments, a network environment may be configured with a page such as a web page which is configured to launch and connect to an instance of the server program. The page may include a page file containing page code (HTML or other markup language, scripts or code), stored or generated by the server computer system, that references resources at the server computer system or other network locations, such as additional server computer systems. The page file or related resources may include scripts or other code executable to launch and connect to an instance of the server program.

Those skilled in the relevant art will appreciate that the embodiments can be implemented or practiced in a variety of computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, stored as firmware in chips, as well as distributed electronically over the Internet or over other networks (including wireless networks). Example chips may include Electrically Erasable Programmable Read-Only Memory (EEPROM) chips.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Software instructions in the form of computer-readable program code may be stored, in whole or in part, temporarily or permanently, on a non-transitory computer readable medium. The computer-readable program code can be operated on by a processor to perform steps, operations, methods, routines or portions thereof described herein. A "computer-readable medium" is a medium capable of storing data in a format readable by a computer and can include any type of data storage medium that can be read by a processor. Examples of non-transitory computer-readable media can include, but are not limited to, volatile and non-volatile computer memories, such as RAM, ROM, hard drives, solid state drives, data cartridges, magnetic tapes, floppy diskettes, flash memory drives, optical data storage devices, compact-disc read-only memories. In some embodiments, computer-readable instructions or data may reside in a data array, such as a direct attach array or other array. The computer-readable instructions may be executable by a processor to implement embodiments of the technology or portions thereof.

A "processor" includes any, hardware system, hardware mechanism or hardware component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any suitable programming language can be used to implement the routines, methods or programs of embodiments of the invention described herein, including R, Python, C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols.

Any particular routine can execute on a single computer processing device or multiple computer processing devices, a single computer processor or multiple computer processors. Data may be stored in a single storage medium or distributed through multiple storage mediums.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system for automatic translation of a content item comprising:
one or more processors configured to:
identify translation items including components to be translated and non-translation items including components not to be translated;
generate a key-value pair corresponding to each of the translation items, wherein each key-value pair includes a key which comprises a unique identifier and a value which comprises a text string of the translation item;
generate a translation template that corresponds to the content item, wherein the translation template matches the content item except that the text string of each translation item is replaced by the key of the corresponding key-value pair;
provide, for each of the key-value pairs, a corresponding translation; and
generate a translated content item based on the translation template and the generated translations, wherein each translation replaces the corresponding key in the translation template;
wherein the one or more processors include a translation processor configured to provide the text of each translation item to a translation engine and receive a corresponding translation which is associated with the unique identifier of the text of the translation item, wherein the translation processor is configured to provide the text of each translation item to the translation engine of a publicly available translation service via an API of the publicly available translation service, wherein each translation item is contained in a single text string comprising a concatenation of a plurality of key-value pairs, each key-value pair including the text of a corresponding one of the translation items and the corresponding unique identifier.

2. The system of claim 1, wherein the one or more processors comprise:
a translation item markup processor which is configured to identify components contained within the content item and mark non-translation items to be skipped;
an XML tag markup processor configured to identify tags of translation items and mark tags of the translation items to be skipped;
a text extraction and identification processor configured to for each translation item, identify text of the translation item and associate a corresponding unique identifier with the identified text and generate a translation template in which the text of each translation item is replaced with the corresponding unique identifier; and
a template fill processor configured to for each unique identifier, replacing the unique identifier in the translation template with the translation corresponding to the unique identifier and thereby produce a translated content item.

3. The system of claim 1, wherein the one or more processors are configured to maintain a status of translation of the content item in a translation processing data object, wherein the translation template is stored in the translation processing data object.

4. The system of claim 1, wherein the one or more processors are configured to identify translation items and non-translation items by, for each of the content items, identifying a corresponding content item template and identifying translation items and non-translation items according to tagging defined by the content item template.

5. A method for automatic translation of a content item, the method comprising:
identifying translation items including components of a base-language content item to be translated and non-translation items including components of the base-language content item not to be translated;
generating a key-value pair corresponding to each of the translation items, wherein each key-value pair includes a key which comprises a unique identifier and a value which comprises a text string of the translation item;
generating a translation template that corresponds to the base-language content item, wherein the translation template matches the base-language content item except that the text string of each translation item is replaced by the key of the corresponding key-value pair;
providing, for each of the key-value pairs, a corresponding translation by submitting the tagged key-value pair to a translation engine, and receiving from the translation engine a translated key-value pair comprising the tagged key and a corresponding translated value, wherein submitting the tagged key-value pair to the translation engine comprises submitting the tagged key-value pair to a publicly available translation processor via an API of the translation processor; wherein a plurality of tagged key-value pairs are concatenated and a resulting single text string comprising a concatenation of the tagged key-value pairs is provided to the translation processor in a single API call; and generating a translated content item based on the template and the generated translations, wherein each translation replaces the corresponding key in the translation template.

6. The method of claim 5, wherein providing the translation corresponding to each of the key-value pairs comprises, for each key-value pair, tagging the key to skip translation of the key.

7. The method of claim 5, wherein for one or more of the translation items, the translation item comprises a user-defined tag and a text string, wherein the user-defined tag is unknown to the translation processor.

8. The method of claim 5, wherein identifying the translation items and the non-translation items comprises identifying a content item template corresponding to the base-language content item, wherein the content item template includes a set of tag definitions for tagged items in the base-language content item, and for each of the tagged items determining whether the tagged item is a translation item or a non-translation item based on the identified set of tag definitions.

9. The method of claim 8, wherein the set of tag definitions identifies one or more user-defined tags as either translation items or non-translation items.

10. The method of claim 5, further comprising maintaining a status of translation of the base-language content item in a translation processing data object.

11. The method of claim 5, wherein the method is performed in a batch mode in which a plurality of base-language content items are automatically translated and stored without user intervention.

12. The method of claim 5, wherein the method is performed in an individual translation mode, the method further comprising displaying the base-language content item and the translated content item side-by-side in one or more windows of a user interface.

13. The method of claim 5, wherein generating the translated content item comprises replacing the base-language content item with the translated content item.

14. A computer program product comprising a non-transitory computer-readable medium storing instructions executable by one or more processors to perform:

identifying translation items including components of a base-language content item to be translated and non-translation items including components of the base-language content item not to be translated;

generating a key-value pair corresponding to each of the translation items, wherein each key-value pair includes a key which comprises a unique identifier and a value which comprises a text string of the translation item;

generating a translation template that corresponds to the base-language content item, wherein the translation template matches the base-language content item except that the text string of each translation item is replaced by the key of the corresponding key-value pair;

providing, for each of the key-value pairs, a corresponding translation by submitting the tagged key-value pair to a translation engine, and receiving from the translation engine a translated key-value pair comprising the tagged key and a corresponding translated value, wherein submitting the tagged key-value pair to the translation engine comprises submitting the tagged key-value pair to a publicly available translation processor via an API of the translation processor; wherein a plurality of tagged key-value pairs are concatenated and a resulting single text string comprising a concatenation of the tagged key-value pairs is provided to the translation processor in a single API call; and generating a translated content item based on the template and the generated translations, wherein each translation replaces the corresponding key in the translation template.

15. The computer program product of claim 14, wherein for one or more of the translation items, the translation item comprises a user-defined tag and a text string, wherein the user-defined tag is unknown to the publicly available translation processor.

16. The computer program product of claim 14, wherein the instructions are further executable by the one or more processors to identify the translation items and the non-translation items by identifying a content item template corresponding to the base-language content item, wherein the content item template includes a set of tag definitions for tagged items in the base-language content item, and for each of the tagged items determining whether the tagged item is a translation item or a non-translation item based on the identified set of tag definitions.

17. The computer program product of claim 14, wherein the instructions are further executable by the one or more processors to maintain a status of translation of the base-language content item in a translation processing data object, wherein the translation template is stored in the translation processing data object.

18. The computer program product of claim 14, wherein the instructions are further executable by the one or more processors to identify translation items and non-translation items by, for each of the content items, identifying a corresponding content item template and identifying translation items and non-translation items according to tagging defined by the content item template.

* * * * *